Patented July 13, 1937

2,086,704

UNITED STATES PATENT OFFICE 2,086,704

COMPOUNDS OF THE AZABENZANTHRONE SERIES

Friedrich Ebel, Mannheim, Germany, assignor to General Aniline Works, Inc., New York, N. Y., a corporation of Delaware No Drawing. Application October 6, 1934, Serial No. 747,247. In Germany November 29, 1933

6 Claims. (Cl. 260—40)

The present invention relates to compounds of the azabenzanthrone series and a process of producing same.

In my copending application Ser. No. 747,246 filed on October 6th, 1934, I have described a process of producing nitrogenous condensation products which comprises causing condensing agents of the Friedel-Crafts-type to act on dicarboxylic acid imides of the general formula:

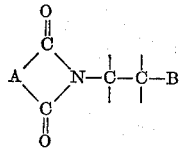

in which A is an aromatic radicle and B an aromatic radicle containing at least one free ortho-position.

I have now found, that valuable compounds of the azabenzanthrone series can be obtained by treating those of the said nitrogenous condensation products which have an unoccupied 8-position in the isoquinoline ring with acid-reacting, water-extracting condensing agents, such as aluminium chloride or concentrated or fuming sulfuric acid, chlorsulfonic acid, sulfuryl chloride or anhydrous phosphoric acid as for example subsequently to the condensation of the dicarboxylic acid imides by means of aluminium chloride for the preparation of the said nitrogenous condensation products. The latter may also be first isolated and then subjected to the action of the said acid condensing agents. The simplest case may be represented by the following reaction scheme:

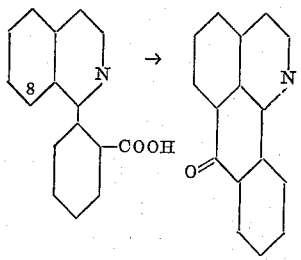

Thus by the influence of condensing agents Bz3-azabenzanthrone is obtained from beta-phenylethylphthalimide by way of an isoquinoline carboxylic acid. The preparation of the nitrogenous condensation products having a free 8-position in the isoquinoline ring according to the said application Ser. No. 747,246 filed October 6th, 1934 by causing condensing agents of the Friedel-Crafts type to act at a temperature sufficiently elevated to cause the reaction on imides of ortho-dicarboxylic acids of the benzene series corresponding to the general formula

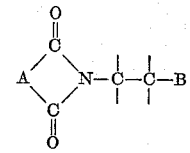

wherein A is a radicle of the benzene series and B an aromatic radicle containing at least one free ortho-position and wherein the free linkages of the carbon atoms of the—

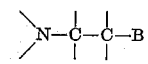

chain may be satisfied by hydrogen or such substituents as permit the formation of a double linkage under the influence of condensing agents and the condensation according to the present invention may also be effected in one operation.

The following examples will further illustrate how my said invention may be carried out in practice but the invention is not restricted to these examples. The parts are by weight.

Example 1

100 parts of alpha-phenylisoquinoline-ortho'-carboxylic acid (prepared according to Example 1 of the application Ser. No. 747,246 filed on October 6th, 1934 by heating phenylethylphthalimide with a mixture of sodium chloride and anhydrous aluminum chloride at about 160° C.) are heated for 3 hours at 100° C. in 1,500 parts of fuming sulfuric acid containing 23 per cent of $SO_3$. The solution thus becomes orange-red and exhibits a marked yellow fluorescence. By pouring into water, the greater part of the Bz-3-azabenzanthrone formed is precipitated in the form of fine yellow needles. By neutralizing the sulfuric acid in the mother liquor, further amounts of the reaction product are obtained. The crude product obtained in very good yields has a melting point of from 178° to 180° C. The pure Bz-3-azabenzanthrone, obtained from glacial acetic acid by crystallization, melts at 185° C., dissolves in hot 10 per cent sulfuric acid giving a yellow coloration and crystallizes out again upon cooling. When vatted in the warm it yields a brown vat.

Example 2

100 parts of alpha-phenylphenanthridine-ortho'-carboxylic acid (prepared according to Example 2 of the said application Ser. No. 747,246 filed on October 6th, 1934 by heating a mixture of ortho-aminodiphenyl and phthalic anhydride at 165° C. and further heating the resulting compound at 180° C. in the presence of a mixture of sodium chloride and anhydrous aluminium chloride) are dissolved in 500 parts of chlorsulfonic acid. After allowing to stand for about 2 hours, 300 parts of concentrated sulfuric acid and then 8,000 parts of ice-cold water are added, whereby a quantitative yield of Bz-3-aza-Bz-1.2-benzobenzanthrone having the formula:

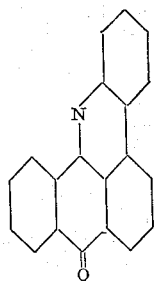

is precipitated. This is obtained in the form of greenish yellow crystals having a melting point of 217° which is increased to 221° C. by crystallization from nitrobenzene. The compound is considerably less basic than the Bz-3-azabenzanthrone obtainable according to Example 1, is scarcely soluble in dilute sulfuric acid; it dissolves in concentrated sulfuric acid giving an orange-red coloration and the solution has a slight yellow fluorescence. The vat is red.

*Example 3*

1 part of the condensation product obtainable according to Example 3 of the said application Ser. No. 747,246 filed on October 6th, 1934 by heating ortho-ortho'-diphthalimidodiphenyl in the presence of trichlorbenzene and anhydrous aluminium chloride at 200° C. having the formula:

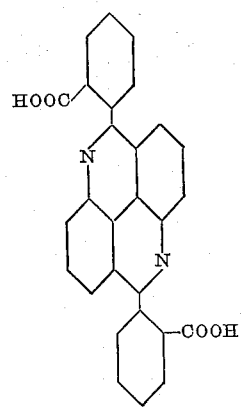

is introduced at 150° C. into a melt of 9 parts of anhydrous aluminium chloride and 1.5 parts of sodium chloride. The temperature is then raised to about 200° C. After heating for about 40 minutes, the melt is allowed to cool. It is then treated with water and diluted hydrochloric acid. The reaction product formed is then filtered off by suction, washed with water and dried. The flavanthrone thus obtained may be purified by way of its vat.

The reaction may also be carried out in one operation by combining the process described in Example 3 of the said copending application Ser. No. 747,246 filed October 6th, 1934 and the process set forth in the present example.

*Example 4*

1 part of the chlorphenylisoquinoline carboxylic acid (obtainable according to Example 4 of the said application Ser. No. 747,246, filed October 6th, 1934) is introduced into 10 parts of fuming sulfuric acid containing 23 per cent of $SO_3$ and heated at about 100° C. for one hour. After cooling, the mass is poured into water. After neutralizing the main amount of sulfuric acid by means of sodium hydroxide solution, a precipitate is obtained which is probably a mixture of 6- and 7-chlor-azabenzanthrone. It is isolated in the usual manner and forms yellow crystals which melt between 178° and 186° C.

*Example 5*

1 part of 1-phenyl-7-chlor-isoquinoline-2'-carboxylic acid (obtainable according to Example 5 of the said application Ser. No. 747,246, filed October 6th, 1934) is introduced into 10 parts of chlorsulfonic acid and allowed to stand for 2 hours at room temperature. After cautiously adding water, the main amount of the acid is neutralized by adding sodium hydroxide solution. The precipitate thus formed is filtered off by suction. By recrystallization from butanol, yellow needles are obtained which melt at from 168° to 170° C. The product is 4-chlor-Bz3-azabenzanthrone having the formula:

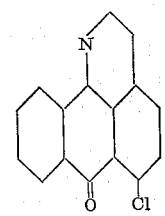

What I claim is:
1. Bz3-azabenzanthrones corresponding to the general formula:

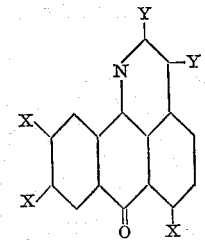

in which one X stands for an element selected from the group consisting of hydrogen and chlorine the other X's being hydrogen, and in which the positions marked Y are occupied by a substituent selected from the class consisting of hydrogen and the grouping

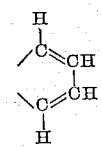

2. Bz3-azabenzanthrone.
3. 4-Chlor-Bz3-azabenzanthrone.
4. Bz1.2-benzo-Bz3-azabenzanthrone.

5. A process of producing Bz3-azabenzanthrones which comprises treating nitrogenous condensation products having the formula:

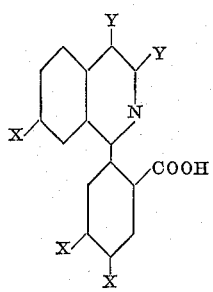

in which one X stands for an element selected from the class consisting of hydrogen and chlorine the other X's being hydrogen, and in which the positions marked Y are occupied by a substituent selected from the class consisting of hydrogen and the grouping—

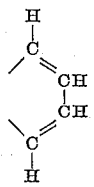

with acid-reacting water-extracting agents.

6. A process of producing Bz3-azabenzanthrones which comprises treating nitrogenous condensation products having the formula:

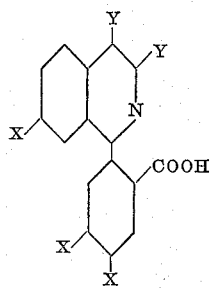

in which one X stands for an element selected from the class consisting of hydrogen and chlorine the other X's being hydrogen, and in which the positions marked Y are occupied by a substituent selected from the class consisting of hydrogen and the grouping—

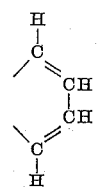

with a condensing agent selected from the class consisting of anhydrous aluminium chloride, fuming sulfuric acid, chlorsulfonic acid, and sulfurylchloride.

FRIEDRICH EBEL.